US006032021A

United States Patent [19]

Sato

[11] Patent Number: 6,032,021

[45] Date of Patent: Feb. 29, 2000

[54] RADIO SELECTIVE CALLING RECEIVER

[75] Inventor: Yukio Sato, Shizuoka, Japan

[73] Assignee: NEC Corporation, Tokyo, Japan

[21] Appl. No.: 08/914,824

[22] Filed: Aug. 20, 1997

[30] Foreign Application Priority Data

Aug. 21, 1996 [JP] Japan .................................... 8-219823

[51] Int. Cl.[7] ............................... H04Q 7/00; G08B 5/22; G09G 3/00; G09G 3/04

[52] U.S. Cl. ........................ 455/31.1; 455/566; 455/38.1; 340/825.44; 345/30; 345/33; 345/55

[58] Field of Search .................................... 455/31.1, 566, 455/38.1; 340/825.44; 345/50, 51, 59, 55, 30, 33, 38, 40

[56] References Cited

U.S. PATENT DOCUMENTS

| | | | |
|---|---|---|---|
| 4,692,760 | 9/1987 | Unno et al. | 345/30 |
| 4,839,636 | 6/1989 | Zeiss | 345/30 |
| 4,870,402 | 9/1989 | DeLuca et al. | 340/825.44 |
| 4,994,784 | 2/1991 | Yoon . | |
| 5,859,594 | 1/1999 | King et al. | 340/825.44 |
| 5,877,733 | 3/1999 | Uchida et al. | 345/52 |

FOREIGN PATENT DOCUMENTS

| | | |
|---|---|---|
| 0 646 900 A1 | 4/1995 | European Pat. Off. . |
| 64-54435 | 4/1989 | Japan . |
| KOKAI2-1041 | 1/1990 | Japan . |
| 7-129516 | 5/1995 | Japan . |
| 8-96273 | 4/1996 | Japan . |
| 9-130839 | 5/1997 | Japan . |
| 9-322214 | 12/1997 | Japan . |
| 2 274 528 | 7/1994 | United Kingdom . |

OTHER PUBLICATIONS

Japanese Office Action dated Sep. 1, 1998 with English language translation of Japanese Examiner's comments.

*Primary Examiner*—Dwayne D. Bost
*Assistant Examiner*—Raymond B. Persino
*Attorney, Agent, or Firm*—Whitham, Curtis & Whitham

[57] ABSTRACT

A radio selective calling receiver includes a radio section, a display section, and a CPU. The radio section receives a radio selective signal from a base station. The display section has first and second display areas and displays the message contained in the radio selective signal from the radio section in a dot matrix. The CPU automatically switches between the first display mode of using only the first display area and the second display mode of using both the first and second display areas in accordance with the contents of the message.

11 Claims, 5 Drawing Sheets

RADIO SELECTIVE CALLING RECEIVER

BACKGROUND OF THE INVENTION

The present invention relates to a radio selective calling receiver and, more particularly, to a radio selective calling receiver which expands the display area in accordance with a message contained in a call signal.

With the remarkable recent advances in radio selective calling receivers, a wide variety of services have been required. Demands have also arisen for radio selective calling receivers capable of displaying messages constituted by icons, kanji characters, and the like (to be referred to as graphic information hereinafter) and messages constituted by alphabetic characters, kana characters, numbers, symbols, and the like (to be referred to as general messages hereinafter). Messages themselves tend to increase in length. On the other hand, a radio selective calling receiver of this type is required to be reduced in size and weight owing to the manner it is used, and hence the display area of the display section constituted by an LCD (Liquid Crystal Display) for displaying messages has its own limit.

In a conventional radio selective calling receiver of this type, when the number of characters/numbers of display information is large, the information cannot be displayed collectively within the limited display area and overflows. To solve this problem, for example, Japanese Patent Laid-Open No. 2-1041 discloses a technique of transferring part of display information which is to be displayed on a predetermined message display area to another display area so as to display the information collectively.

Japanese Patent Laid-Open No. 2-1041 discloses an electronic device having a display section constituted by a dot matrix display section and a segment display section. In this electronic device, when numerical information exceeding a predetermined number of characters is to be displayed as a message on the segment display section, only the numerical information corresponding to the predetermined number of characters is displayed on the segment display section, and the overflow of the numerical information exceeding the predetermined number of characters is temporarily stored in a memory. A key input section is then operated to input a display switching instruction so as to convert the numerical information which has already been displayed on the segment display section into dot matrix display information and transfer it to the dot matrix display section, thereby displaying it. Subsequently, the overflow of the numerical information is read out from the memory to be displayed on the segment display portion on which no information is displayed. With this operation, the numerical information, which cannot be displayed collectively on the segment display section, is displayed collectively.

According to the above conventional message display scheme, a display switching instruction is used to transfer numerical information displayed on the segment display section to the matrix display section and display the overflow of the numerical information on the segment display section. Therefore, the key input section must be operated to input the display switching instruction, requiring a cumbersome operation.

In addition, this scheme demands a memory for temporarily storing numerical information overflowing the segment display section, and a data converter for converting segment display information into matrix display information, interfering with reductions in size, weight, and cost.

SUMMARY OF THE INVENTION

It is an object of the present invention to provide a radio selective calling receiver which expands the display area, upon reception of general message information constituted by alphabetic characters, kana characters, numbers, and symbols, to display the information without changing the control performance of the LCD driver.

In order to achieve the above object, according to the present invention, there is provided a radio selective calling receiver comprising receiving section for receiving a radio selective signal from a base station, a display section having first and second display areas and adapted to display a message contained in the radio selective signal from the receiving means in a dot matrix, and display control means for automatically switching between a first display mode of using only the first display area and a second display mode of using both the first and second display areas in accordance with contents of the message.

DESCRIPTION OF THE PREFERRED EMBODIMENT

The present invention will be described in detail below with reference to the accompanying drawings.

Figure 1:
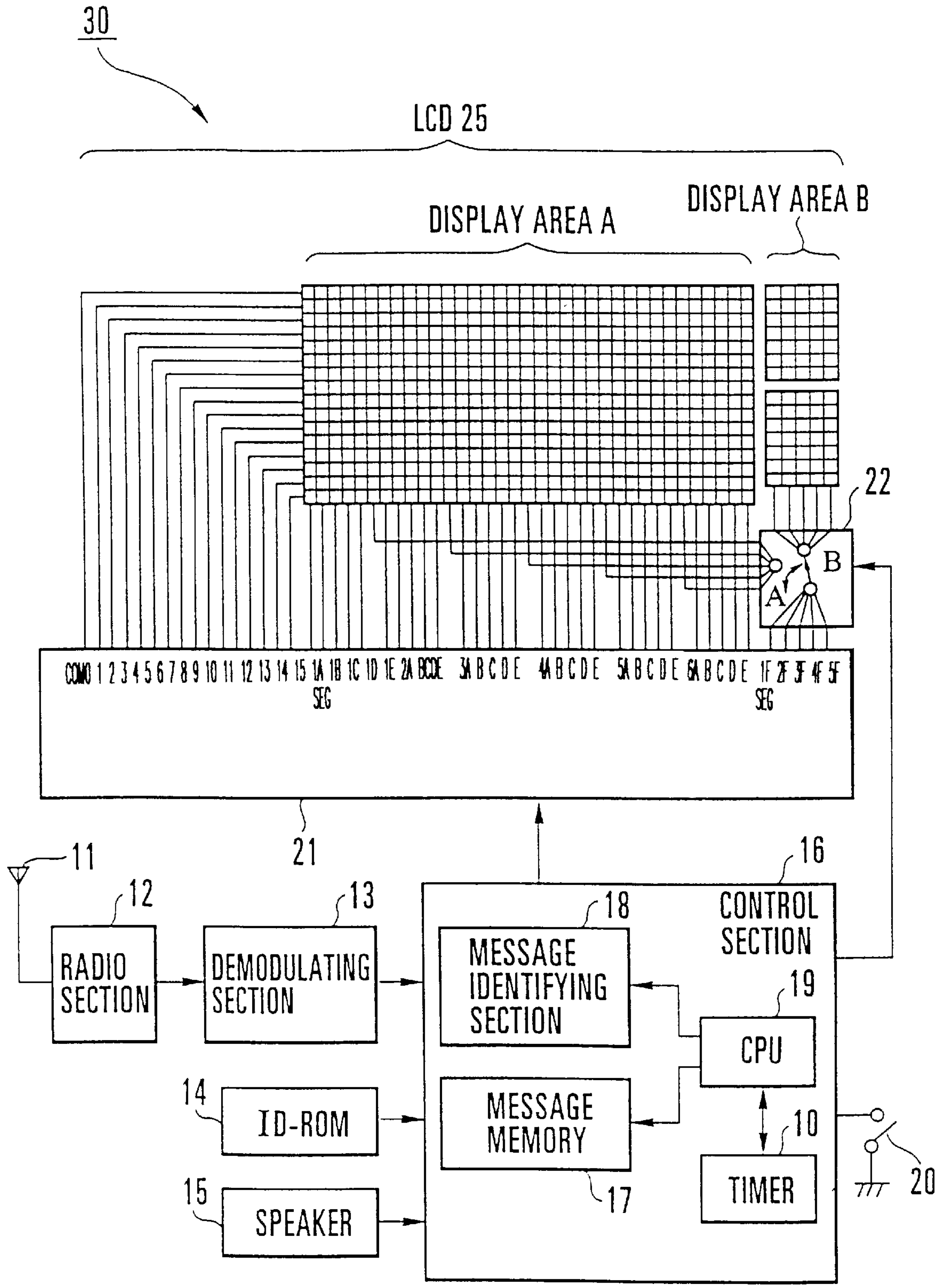
FIG. 1 is a diagram showing the arrangement of the main part of a radio selective calling receiver according to an embodiment of the present invention.

FIG. 1 shows the arrangement of the main part of a radio selective calling receiver according to an embodiment of the present invention. Referring to FIG. 1, a radio selective calling receiver 30 includes a radio section 12 for receiving/amplifying a radio selective signal through an antenna 11, a demodulating section 13 for demodulating the radio selective signal received by the radio section 12, an ID-ROM (Identification-Read Only Memory) 14 storing the self-call number in advance, a speaker 15 for notifying the reception of a call signal, a power switch 20, an LCD 25 having a display area A and a display area B, an LCD driver 21 for driving the LCD 25, a display switch 22 for switching the display areas of the LCD 25 in accordance with a display mode, and a control section 16 for controlling the speaker 15, the LCD driver 21, and the display switch 22 on the basis of outputs from the demodulating section 13 and the ID-ROM 14.

The control section 16 includes a timer 10, a message memory 17 for storing message information following a call signal of a radio selective signal demodulated by the demodulating section 13 when the call signal coincides with the self-call number written in the ID-ROM 14, a message identifying section 18 for determining whether the message information is graphic information or general message information, and a CPU (Central Processing Unit) 19 for controlling the display switch 22 on the basis of the determination result obtained by the message identifying section 18, and reading out the message information from the message memory 17 and outputting it to the LCD driver 21.

In the radio selective calling receiver having the above arrangement, a radio selective signal received through the antenna 11 is received/amplified by the radio section 12 and sent to the demodulating section 13. The demodulating section 13 demodulates the radio selective signal from the radio section 12 and outputs the demodulated signal to the control section 16. The CPU 19 of the control section 16 compares the self-call number stored in the ID-ROM 14 with the call signal of the radio selective signal from the demodulating section 13. When they coincide with each other, the CPU 19 determines that the call is addressed to the home receiver.

Upon determining that the call is addressed to the home receiver, the CPU 19 stores a message signal following the call signal and addressed to the home receiver as the latest message in the message memory 17, and performs a calling/notifying operation by using the LCD 25 and the speaker 15.

If this message signal is constituted by graphic information such as icons, or kanji characters, the signal generally contains message identification information (e.g., ", [, [", or "--") to discriminate it from general message information.

In the calling/notifying operation, the control section 16 outputs the latest message from the message memory 17 to the message identifying section 18. The message identifying section 18 determines, depending on the presence/absence of graphic information in the message, i.e., message identification information, whether the message from the message memory 17 is graphic information constituted by icons, kanji characters, and the like or general message information constituted by alphabetic characters, kana characters, numbers, symbols, and the like. If message identification information is contained in the message, the CPU 19 switches the display switch 22 to the terminal A side to display the graphic information.

If no message identification information is contained in the message, the CPU 19 switches the display switch 22 to the terminal B side to display the general message constituted by alphabetic characters, kana characters, numbers, symbols, and the like. Note that each character of the general message information is constituted by 5×7 dots.

Upon switching the display switch 22, the CPU 19 reads out the message from the message memory 17 and outputs it to the LCD driver 21. With this operation, the message is displayed on the LCD 25.

If the message information is graphic information, the message is graphically displayed on the display area A (first display mode). If the message is general message information containing no message identification information and constituted by alphabetic characters, kana characters, numbers, symbols, and the like, the message is segment-displayed on both the display areas A and B (second display mode).

Figure 3:
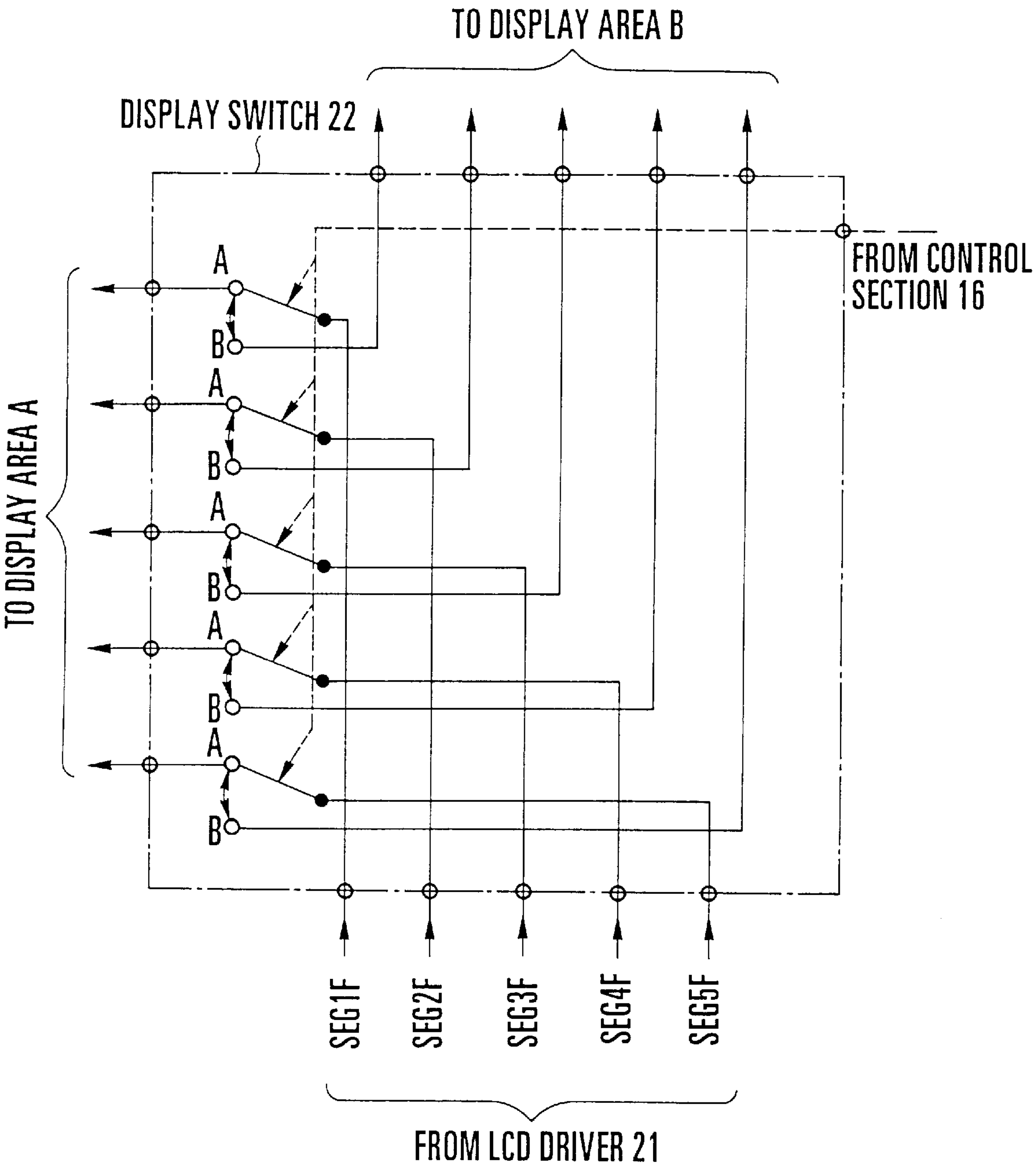
FIG. 3 is an enlarged view of the interconnection pattern of a display switch in FIG. 1.

As shown in FIG. 3, the display switch 22 switches terminals SEG1F, SEG2F, SEG3F, SEG4F, and SEG5F of the LCD driver 21 to the terminal A side or the terminal B side. When, for example, each character information is to be displayed in 5×7 dots, dots corresponding to sixth column, 12th column, 18th column, 24th column, . . . for graphic display must be ensured as character pitches and hence an available area. To extract, as the display area B, dots corresponding to this available area from the display area A, the display switch 22 is operated to switch the driving signal lines for the dots corresponding to the available area, which extend from the LCD driver 21, from the display area A to the display area B.

Figure 2:
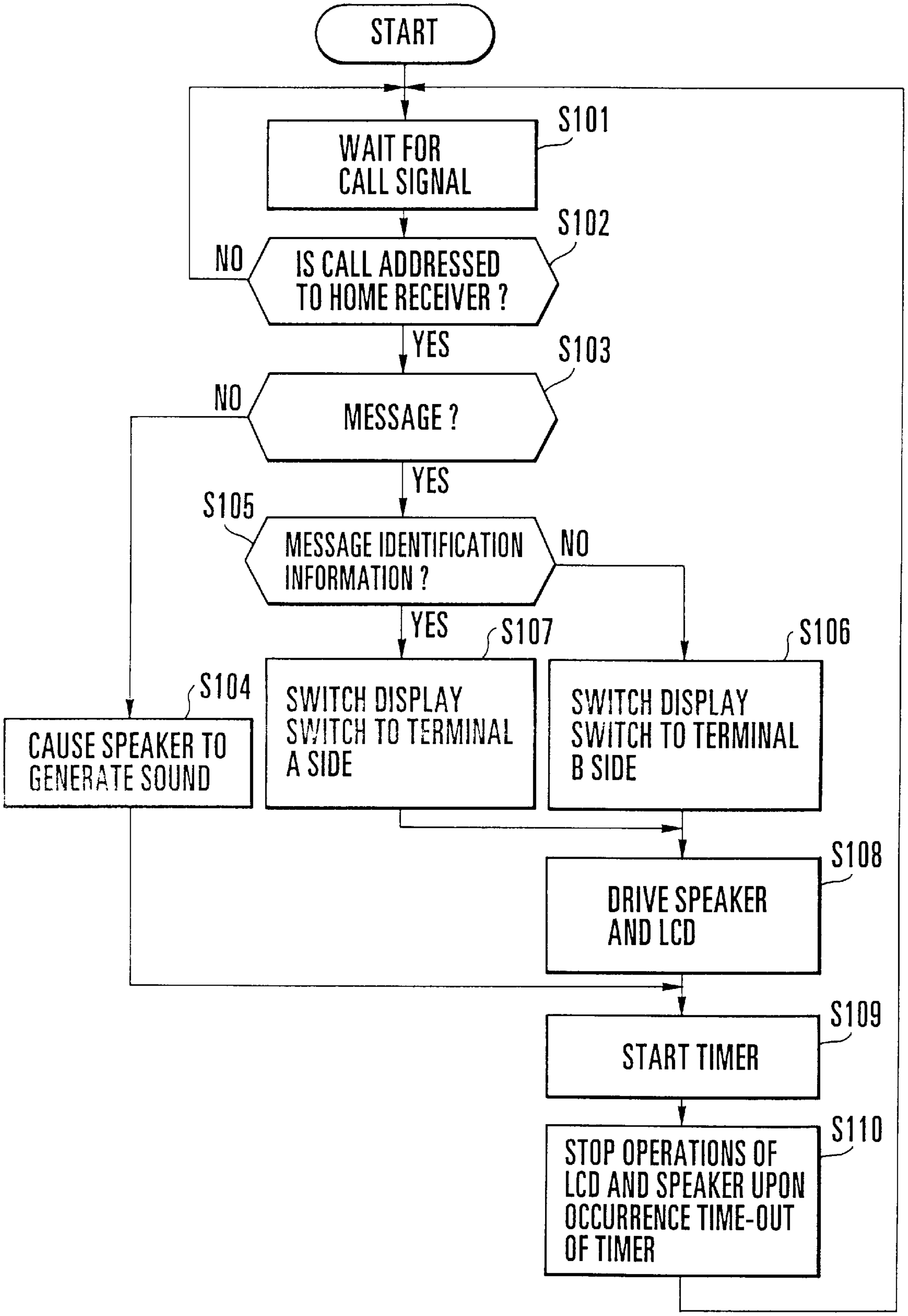
FIG. 2 is a flow chart showing message display processing to be performed by the radio selective calling receiver in FIG. 1.

Display processing for message information will be described next with reference to FIG. 2. While the radio selective calling receiver 30 is in the standby state (step S101), the CPU 19 compares the call signal of the selective call signal received by the radio section 12 and demodulated by the demodulating section 13 with the self-call number stored in the ID-ROM 14 (step S102). Upon determining that the call is addressed to the home receiver, the CPU 19 checks whether a message signal follows the call signal (step S103).

If the CPU 19 determines in step S103 that no message follows the call signal, the CPU 19 causes the speaker 15 to generate a sound so as to perform a calling/notifying operation (step S104). At the same time, the CPU 19 starts the timer 10 (step S109). If the CPU 19 determines in step S103 that a message follows the call signal, the message identifying section 18 determines, depending on the presence/absence of message identification information contained in the message, whether the message is graphic information constituted by icons, kanji characters, and the like or general message information constituted by alphabetic characters, kana characters, numbers, symbols, and the like (step S105).

If it is determined in step S105 that the message is general message information, the CPU 19 switches the display switch 22 to the terminal B side (step S106), and reads out the latest message from the message memory 17 and outputs it to the LCD driver 21.

If it is determined in step S105 that the message is graphic information, the CPU 19 switches the display switch 22 to the terminal A side (step S107), and reads out the latest message from the message memory 17 and outputs it to the LCD driver 21.

The graphic information or the general message information read out from the message memory 17 is displayed on the designated display area A or B of the LCD 25 through the LCD driver 21 (step S108). At the same time, the CPU 19 starts the timer 10 (step S109).

Assume that it is determined in step S109 that a time-out of the timer 10 has occurred. In this case, if the message is general message information, the speaker 15 stops generating the sound. If the message is graphic information, the speaker 15 stops generating the sound and the LCD 25 stops displaying the message (step S110). Thereafter, the flow advances to step S101 to set the receiver in the standby state. Note that the sound generating operation of the speaker 15 and the display operation of the LCD 25 can be stopped before a time-out of the timer 10 occurs by operating the power switch 20 by a predetermined method during the operation of the timer 10.

Figure 4:
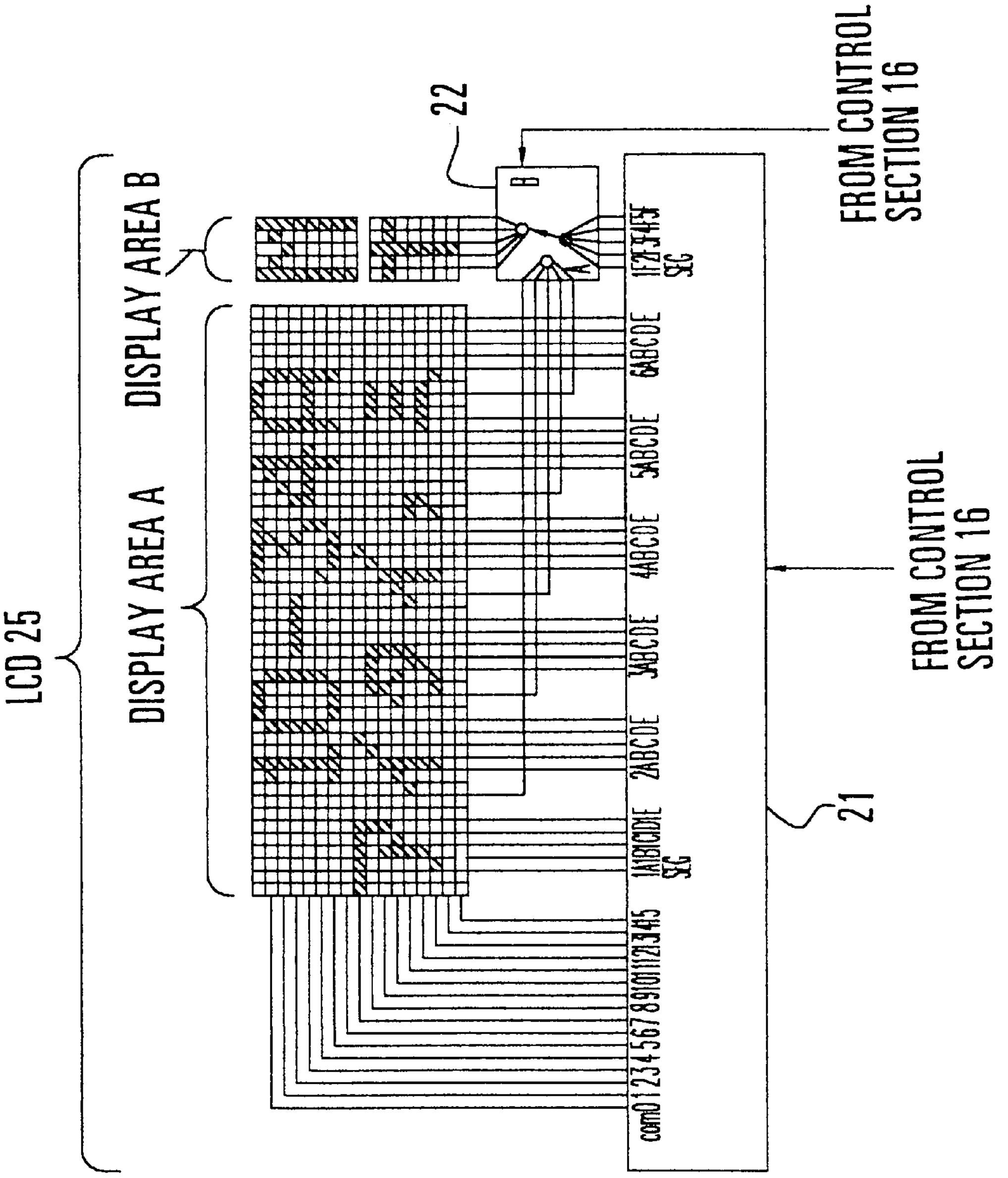
FIG. 4 is a view showing an example of the segment display of general message information on an LCD in FIG. 1.
Figure 5:
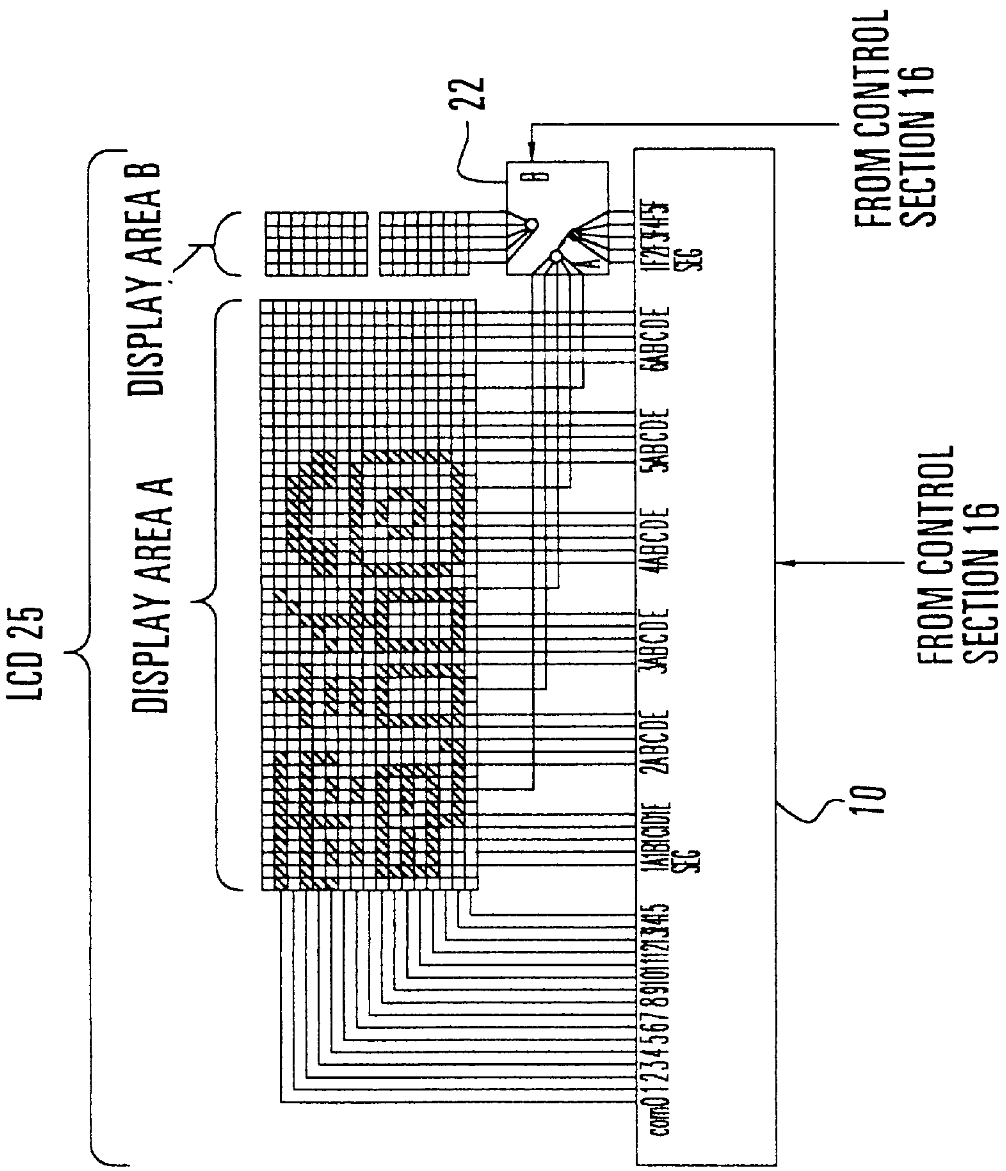
FIG. 5 is a view showing an example of the graphic display of graphic information on the LCD in FIG. 1.

FIGS. 4 and 5 show display samples on the LCD in step S108. FIG. 5 shows a display sample displayed when the display switch 22 is switched to the terminal A side, i.e., graphic information constituted by icons, kanji characters, and the like is displayed. FIG. 4 shows a display sample displayed when the display switch 22 is switched to the terminal B side, i.e., general message information constituted by alphabetic characters, kana characters, numbers, symbols, and the like is displayed.

As shown in FIG. 4, when general message information constituted by alphabetic characters, kana characters, numbers, symbols, and the like is to be displayed, one character is displayed in 5 (horizontal)×7 (vertical) dots, while control on the terminals SEGLF, SEG2F, SEG3F, SEG4F, and SEG5F is stopped to ensure 1-dot character spacings in the display area A in both the vertical and horizontal directions. In addition, the segments corresponding to these 1-dot character spacings are switched by the display switch 22 to expand the display area by 1-character (5×7 dots) display area as the display area B.

When, therefore, general message information alphabetic characters, kana characters, numbers, symbols, and the like is to be displayed on the display area A, the respective 1-dot character spacings, which are not used in a normal operation, can be effectively used in the display area B, thereby displaying 1-character information more for every 5 characters. Referring to FIG. 4, since the message is displayed in two rows, information corresponding to 1 character in the upper row and 1 character in the lower row, i.e., a total of 2 characters, can be displayed more. In this case, "10–30 AM ΔΔΔΔ, □□" is displayed on the LCD 25, with "M" and the second "□" being displayed on the display area B. Note that "ΔΔΔΔ" indicates "I want to see you" in kana characters, and "□□" indicates the name of the sender in kana characters.

As shown in FIG. 5, when graphic information constituted by icons, kanji characters, and the like is to be displayed, all the dots in the display area A are effectively used, without stopping control on the terminals SEG1F, SEG2F, SEG3F, SEG4F, and SEG5F, to enlarge and display the icon and the kanji characters, thereby allowing the user to easily read them. In this case, the display area B is set in an empty state. According to this display sample, "ΔΔx" is displayed on the display area A of the LCD 25. Note that "ΔΔ" indicates "telephone" in kanji characters, and "x" indicates an icon representing a telephone.

Since the use frequency of general message information is generally much higher than that of graphic information, the display area B is effectively used.

In checking a stored message, as in a calling operation, if the message is identified as general message information or graphic information in accordance with message identification information contained in the message, and the display switch 22 is switched to the terminal A side or the terminal B side, the same display operation as described above can be performed.

As has been described above, according to the present invention, when a message contained in a radio selective signal is automatically identified as general message information, the display switch is controlled to expand the general message display area to the second display area, thereby continuously displaying the general message information on both the first and second display areas collectively. Therefore, no cumbersome operation is required to expand the display area unlike the prior art.

In addition, since neither a temporary memory nor a data converter for display information is required, unlike the prior art, reductions in size, weight, and cost can be attained. Furthermore, since a plurality of 1-dot display areas which are not used to ensure character spacings in displaying general message information can be used in the second display area, the entire display section can be effectively used.

What is claimed is:

1. A radio selective calling receiver comprising:

a receiving section for receiving a radio selective signal from a base station;

a display section having first and second display areas adjacent to one another and adapted to display a message contained in the radio selective signal from said receiving means in a dot matrix; and display control means for automatically switching signal lines between a first display mode of using only the first display area and a second display mode of using both the first and second display areas to display the received message in accordance with contents of the message, wherein dots controlled by said signal lines comprise spaces in said first display area when in said second display mode.

2. A receiver according to claim 1, wherein said display control means displays the message in the first display mode when the contents of the message are graphic message information comprising at least one of an icon and a kanji character, and displays the message in the second display mode when contents of the message are general message information comprise at least one of an alphabetic character, a kana character, a number, and a symbol.

3. A receiver according to claim 2, further comprising:

a display switch for switching between the first and second display modes in accordance with the contents of the message, wherein when said display switch is switched to the first display mode, the graphic message information is graphically displayed on the first display area, and when said display switch is switched to the second display mode, the general message information is segment-displayed with each character being displayed in n×m (n and m are positive integers) dots.

4. A receiver according to claim 3, further comprising:

message identifying means for identifying the message as the graphic message information or the general message information, and wherein said display control means controls said display switch on the basis of the identification result obtained by said message identifying means.

5. A receiver according to claim 4, wherein the message contains message identification information for identifying the message as the graphic message information or the general message information, and said message identifying means identifies a type of the message by detecting the message identification information contained in the message.

6. A receiver according to claim 1, further comprising:

a message memory for temporarily storing a message contained in a radio selective signal from said receiving means; and timer for measuring a time during which the message is displayed on said display section.

7. A radio selective calling receiver comprising:

a receiving section for receiving a radio selective signal from a base station;

a display section having first and second display areas and adapted to display a message contained in the radio selective signal from said receiving means in a dot matrix;

display control means for automatically switching between a first display mode of using only the first display area and a second display mode of using both the first and second display areas in accordance with contents of the message, wherein said display control means displays the message in the first display mode when the contents of the message are graphic message information comprising at least one of an icon and a kanji character, and displays the message in the second display mode when contents of the message are general message information comprise at least one of an alphabetic character, a kana character, a number, and a symbol;

a display switch for switching between the first and second display modes in accordance with the contents of the message, wherein when said display switch is switched to the first display mode, the graphic message information is graphically displayed on the first display area, when said display switch is switched to the second display mode, the general message information is segment-displayed with each character being displayed in n×m (n and m are positive integers) dots, wherein in the second display mode, the general message information is segment-displayed on the first display area with 1-dot character spacings between each character being displayed in n×m dots, the second display area comprises one n×m-dot segment display area, and in the second display mode, said display switch switches n driving signal lines used as the character spacings in the first display area, to drive the second display area.

8. A receiver according to claim 7, wherein in the second display mode, the general message information is displayed in a plurality of rows on the first and second display areas.

9. A radio selective calling receiver, comprising:

a radio receiver for receiving a radio selective signal comprising information data, said information data comprising one of text data and graphical data;

a first dot matrix display comprising a plurality of rows and columns for displaying both text data and graphical data;

a second dot matrix display adjacent to said first dot matrix display, said second dot matrix display having enough columns to display a single character width of text data;

a display driver comprising first plurality of signal lines connected to drive ones of said plurality of columns of said first dot matrix display, and a second plurality of signal lines; and a switch connected to receive said second plurality of signal lines, wherein when graphical data is received, said switch connects said second signal lines to said columns of said first dot matrix display, and when text data is received, said switch connects said second signal lines to drive said columns in said second dot matrix display wherein columns from said first dot matrix display disconnected by said switch are used as spacings between individual text characters.

10. A radio selective calling receiver as recited in claim 9, further comprising:

a message identifying circuit for distinguishing between text data and graphical data.

11. A radio selective calling receiver as recited in claim 9, wherein said first plurality of signal lines are grouped to connect to said columns in said first dot matrix display one text character wide, each separated by one column connected to said switch.

* * * * *